United States Patent [19]

Ghaem-Maghami et al.

[11] Patent Number: 4,485,394
[45] Date of Patent: Nov. 27, 1984

[54] AUTOMATIC CONVERGENCE AND GRAY SCALE CORRECTION FOR TELEVISION RECEIVERS AND PROJECTION TELEVISION SYSTEMS

[75] Inventors: Sanjar Ghaem-Maghami, Chesapeake; Howard E. Holshouser, Suffolk, both of Va.

[73] Assignee: General Electric Company, Portsmouth, Va.

[21] Appl. No.: 423,906

[22] Filed: Sep. 27, 1982

[51] Int. Cl.³ .............................................. H04N 9/62
[52] U.S. Cl. ...................................... 358/10; 558/139
[58] Field of Search ...................... 358/10, 69, 139, 60, 358/64; 315/368, 13.1

[56] References Cited

U.S. PATENT DOCUMENTS

| | | | |
|---|---|---|---|
| 2,954,424 | 9/1960 | Thiele | 358/10 |
| 3,479,448 | 11/1969 | Kollsman | 358/10 |
| 3,962,722 | 6/1976 | Ciciora | 358/10 |
| 4,001,877 | 1/1977 | Simpson | 358/10 |
| 4,035,834 | 7/1977 | Drury | 358/10 |
| 4,277,797 | 7/1981 | Dangschat | 358/21 R |
| 4,364,079 | 12/1982 | Pons | 358/10 |

FOREIGN PATENT DOCUMENTS

| | | | |
|---|---|---|---|
| 104232 | 8/1979 | Japan | 358/10 |
| 104231 | 8/1979 | Japan | 358/10 |

Primary Examiner—Michael A. Masinick

[57] ABSTRACT

A system for the automatic correction of convergence and gray scale in color television employs light sensors, either singly or in an array, on the beam landing face of a cathode ray tube or on the screen of a projection receiver. The sensors can be placed in the overscanned area of the raster, such that they are outside the normal viewing area, or in the viewing area if the sensors are made sufficiently small. In the vicinity of a sensor, two of the three cathode ray tubes or electron guns are blanked. As the light beam, in the case of a projection system, crosses the sensor, an output is produced. This output is processed to obtain accurate timing characteristics. Since the position of the sensor is known in terms of counts in both the vertical and horizontal directions, error signals can be developed by comparing the timing of the sensor output with the proper count. These error signals are used to develop vertical and horizontal correction signals to correct the convergence of the one cathode ray tube or gun. The process is then repeated for the remaining two cathode ray tubes or guns. The output of the sensor is also amplified by gated amplifiers for each of the cathode ray tubes or guns in sequential order, and the outputs of these amplifiers are compared to a preset value to develop error signals. These error signals are used to set gun drives to correct the gray scale.

12 Claims, 7 Drawing Figures

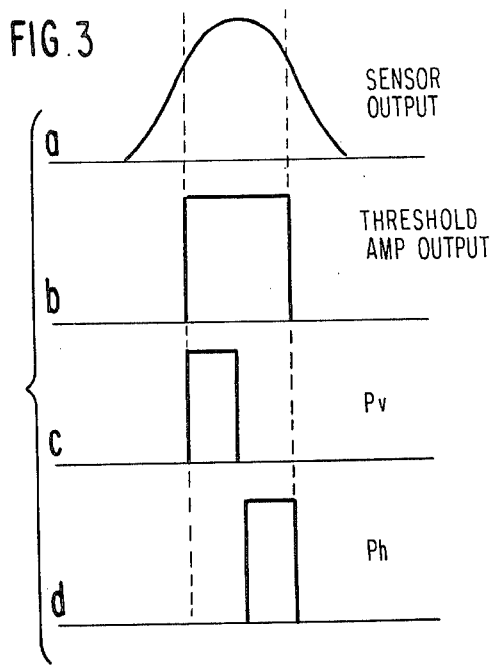
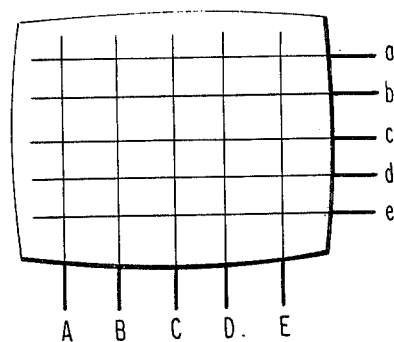
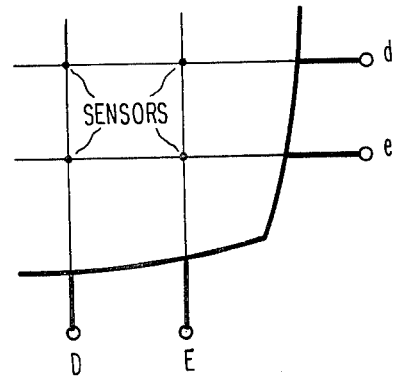
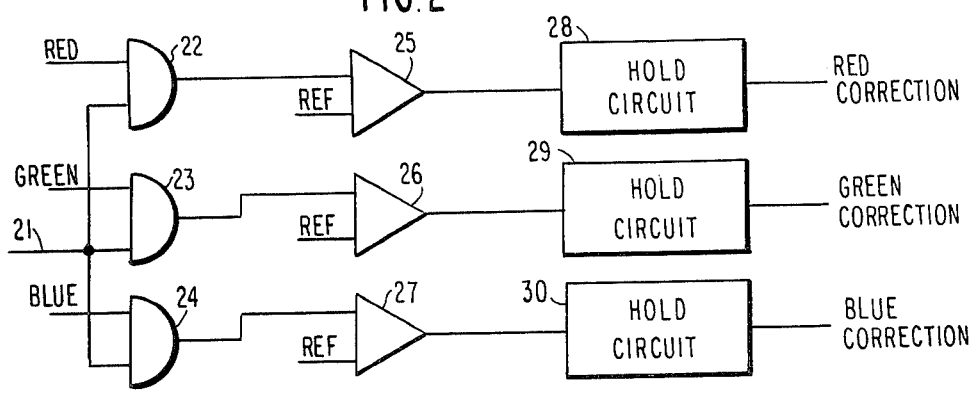
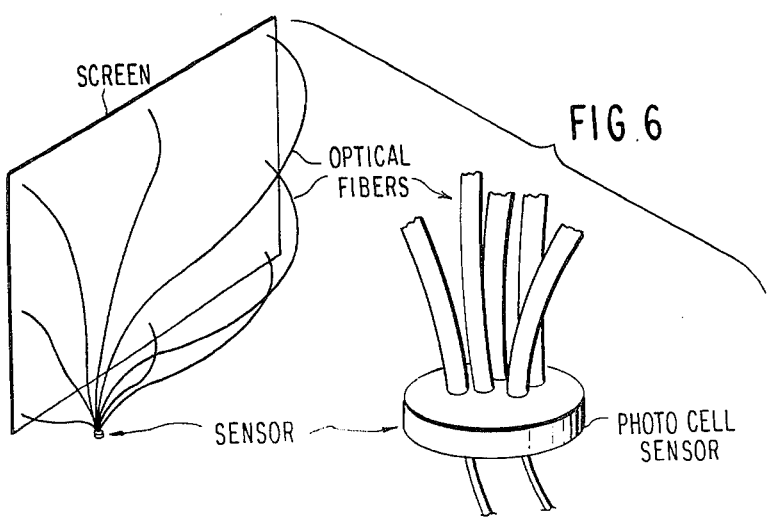

AUTOMATIC CONVERGENCE AND GRAY SCALE CORRECTION FOR TELEVISION RECEIVERS AND PROJECTION TELEVISION SYSTEMS

BACKGROUND OF THE INVENTION

This invention relates to automatic correction systems for color television receivers or CRT monitors and the like and more particularly, to a system for the automatic correction of convergence and gray scale.

Color television receivers of the type employing a cathode ray tube (CRT) having three cathode ray beams and a screen with a mosaic of phosphor dots or stripes of recurring groups of three colors must be adjusted to maintain the convergence and relative beam currents of the three beams over the visible surface of the screen. An analogous adjustment must be made for projection television receivers employing three projection CRTs. These adjustments are initially made at the factory, but with age, temperature and other environmental conditions, it is necessary to readjust convergence and relative beam currents in order to maintain the quality of the reproduced picture. Ordinarily this is accomplished by a skilled technician with test instruments, and the procedure may require the inconvenience of removal of the receiver from the owner's home so that the adjustment can be made at a repair shop.

There are known in the prior art circuits for the automatic control of electron beam intensity to provide for proper color display or color balance. Examples are described in U.S. Pat. No. 2,954,424 issued to Richard Thiele and U.S. Pat. No. 3,479,448 issued to Paul Kollsman.

U.S. Pat. No. 2,954,424 issued to Richard Thiele describes a color television receiver of the type employing a single gun CRT. The screen of the tube is provided with a series of striated vertical color filters in a repetitive sequence such as red, green and blue. Externally of the tube and directed towards its screen is a plurality of photo cells, each sensitive to one color. The photo cells are placed in front of the screen in such a position that the light emitted by the screen can be picked up by the photo cells without interfering with the viewing of the screen. The photo cells are connected together and the output taken through a feedback loop to modulate the grid of the CRT. Also, the photo cells are arranged to be sequentially blanked off so that they cannot convey a signal back through the feedback loop during their blanking time. In operation, if for example the "red" modulated beam sweeps over the screen first, the red light transmitted by the red screen filter elements will irradiate all the photo cells, but the green and blue-sensitive photo cells will not be energized since they are not sensitive to red light. The red-sensitive photo cell is blanked so that no current is fed back to the control grid while the beam is on a red element. However, the scanning beam in its travel will also cause blue and green filter elements to transmit blue and green light, respectively, to the photo cells although the signal bears only "red" modulation. As a result, current will be fed back to the grid of the CRT to suppress the beam while it is passing over the blue and green elements. A similar analysis can be made for the cases of the "blue" and "green" modulated beams. Thus, the Thiele color television receiver merely suppresses the display of those colors which do not correspond to the modulating color signal of the beam. No correction is made for convergence since the Thiele color television receiver employs a single gun CRT.

U.S. Pat. No. 3,479,448 issued to Paul Kollsman describes a system for automatically maintaining the color balance of a scene reproduced by a color television receiver of the type employing a three-gun CRT with a tri-dot phosphor pattern on its screen. In the Kollsman system, a white light spot containing the three primary colors is transmitted from the television station with the program material. This white light spot is reproduced on the screen of the television receiver at a position that is invisible to the viewer. Color imbalance is determined by comparing the ratio of selected reproduced color components of the white spot with a preset reference. Any detected imbalance is automatically corrected by applying appropriate control signals to the screen grids of the CRT. Although the Kollsman system employs a three-gun CRT with a tri-dot phosphor pattern, no mention is made of convergence control. But for the automatic color balance system of Kollsman to work properly, convergence of the three beams is a prerequisite. Moreover, the Kollsman system requires the transmission of a white spot by a cooperating television station.

As will be appreciated by those skilled in the art, correction of convergence is a more difficult problem than correction of relative color intensity, although proper gray scale correction requires the convergence to be in adjustment. The test instruments used to measure convergence often resort to the use of an appliance that is placed over the CRT screen to facilitate detection of the landing point of the cathode ray beam. Such an appliance obscures the screen, and therefore these instruments are not intended to be used simultaneously with the viewing of program material. Examples of such instruments are U.S. Pat. No. 4,001,877 issued to Theodore Frederick Simpson and U.S. Pat. No. 4,035,834 issued to Anthony M. Drury.

U.S. Pat. No. 4,001,877 issued to Theodore Frederick Simpson describes a test instrument that employs a photosensitive array comprising a plurality of individual photo cells, this array being placed over the CRT screen. Further, a special post-deflection coil is required to introduce magnetic fields in the region just forward of the deflection yoke to displace the scanned beams in a controlled pattern from their normal landing points on the screen. The displaced beam causes the emission of an error color, the intensity of which is measured by those photo cells which are sensitive to the error color emitted. The intensity of a reference color emitted by the phosphor deposits stimulated by the undisplaced beam is then measured, and the ratio of the error color to the reference is calculated for each measurement location on the screen. The largest ratio is displayed as an indication of the color purity tolerance of the CRT. The Simpson test instrument is used primarily as a quality control device in the manufacture of color CRTs.

U.S. Pat. No. 4,035,834 issued to Anthony M. Drury describes a beam landing indicator for a color CRT which also employs a holder for positioning a plurality of photo cells over the screen of the CRT. While the Drury instrument does not require a special deflection coil, it does employ a special deflection generator in order to produce a clockwise rotation of the beam landing shift of the beam. This rotation is stepped in increments which occur once each vertical field of the television raster. Light variations sensed by the photo cells are combined with a reference signal to control the dot location on an oscilloscope display of the vector beam landing error. The technician can then make purity adjustments and yoke adjustments of the CRT by observing the oscilloscope display.

Automating the adjustment of color television receivers is also known. An example is described in U.S. Pat. No. 3,962,722 issued to Walter S. Ciciora. More specifically, the Ciciora patent describes a color television setup apparatus for use in the factory. Once again, a holder positions a plurality of photo cells over the CRT screen in such a manner as to obscure the view of the screen. Patterns indicative of the characteristics of contrast, brightness, color and tint are displayed on the CRT. The photo cells develop corresponding electrical signals which are supplied to circuitry that energizes a plurality of bi-directional motors that are engageable with the receiver contrast, tint, brightness and color level adjustment elements.

While the systems described by Simpson, Drury and Ciciora are useful in a factory or shop environment, what is needed is an automatic means for adjustment of convergence and gray scale which is part of the television receiver or CRT monitor. In this way, the receiver or monitor would be continuously maintained in proper adjustment for optimum viewing.

SUMMARY OF THE INVENTION

It is therefore an object of the present invention to provide a means integral with a television receiver or monitor to automatically adjust its convergence and/or gray scale.

It is a further object of the invention to provide an automatic convergence and gray scale adjusting system useful for both three-gun CRT television receivers or projection television receivers.

It is a further object of the invention to provide a system that eliminates convergence and gray scale shifts due to aging, temperature changes, or other environmental factors.

According to the invention, the foregoing and other objects of the invention are attained by a system for the automatic correction of convergence and gray scale which employs light sensors, such as the Fairchild FPT 700 phototransistor, either singly or in an array, on or adjacent to the beam landing face of a cathode ray tube or on or adjacent the screen of a projection receiver. The sensors can be placed proximate to the overscanned area of the raster such that they are outside the normal viewing area, or in the viewing area if the sensors are made sufficiently small. In the vicinity of a sensor, two of the three cathode ray tubes or electron guns are blanked. As the light beam, in the case of a projection system, crosses the sensor, an output is produced. This output is processed to obtain accurate timing characteristics. Since the position of the sensor is known in terms of counts in both the vertical and horizontal directions, error signals can be developed by comparing the timing of the sensor output with the proper count. These error signals are used to develop vertical and horizontal correction signals to correct the convergence of the one cathode ray tube or gun. The process is then repeated for the remaining two cathode ray tubes or guns. The output of the sensor is also amplified by gated amplifiers for each of the cathode ray tubes or guns in sequential order, and the outputs of these amplifiers are compared to a preset value to develop error signals. These error signals are used to set gun drives to correct the gray scale.

BRIEF DESCRIPTION OF THE DRAWINGS

The specific nature of the invention, as well as other objects, aspects, uses and advantages thereof, will clearly appear from the following description and from the accompanying drawings, in which:

FIG. 2 is a block diagram showing further details of the gray scale correction circuitry;

FIG. 3 is a timing diagram for the sensor and count gating;

FIGS. 5 and 5A illustrate a dynamic convergence matrix of light sensors which may be used in the system according to the invention; and FIG. 6 illustrates an arrangement employing a single sensor coupled to various points by means of optical fibers.

DESCRIPTION OF THE PREFERRED EMBODIMENT

Figure 1:
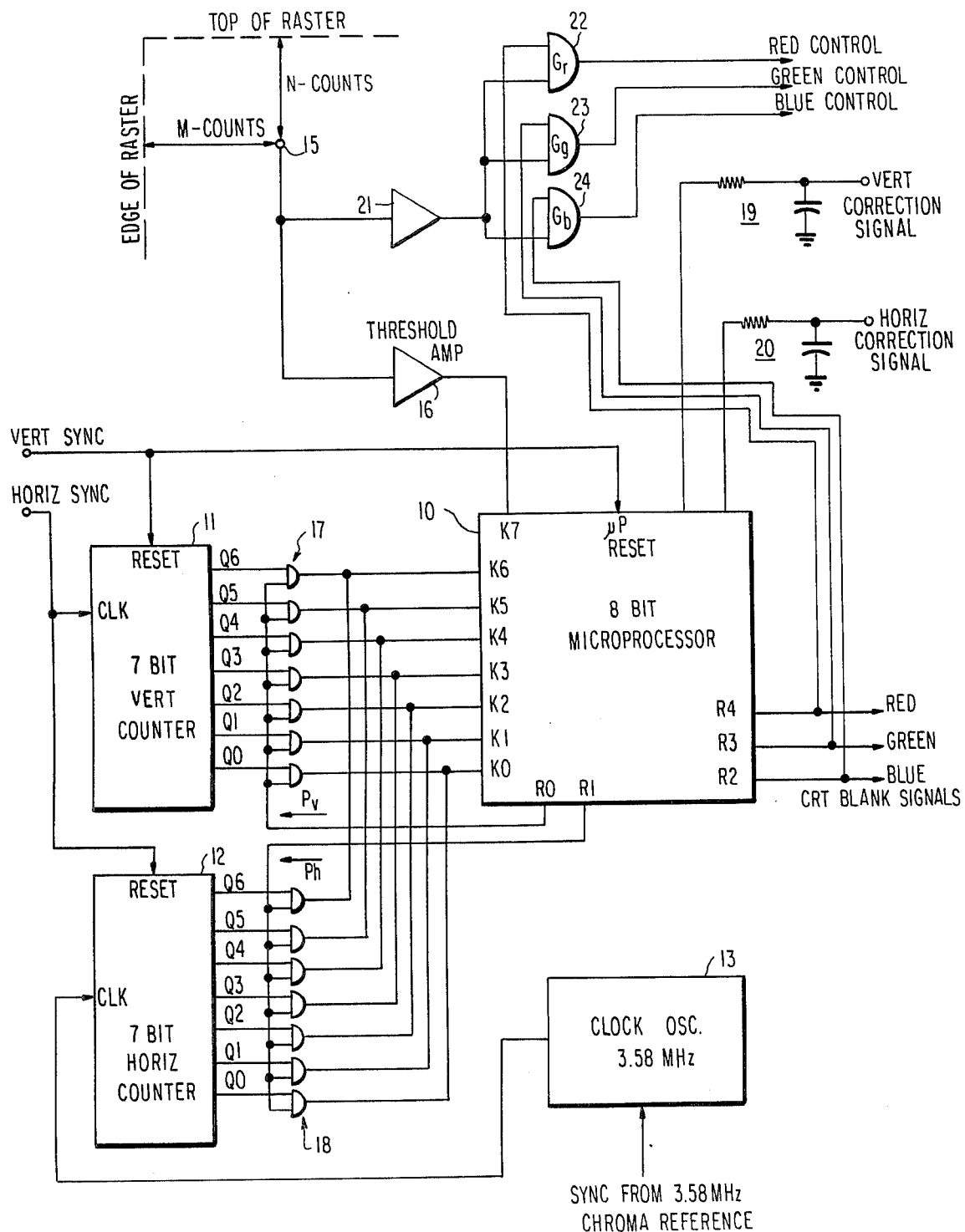
FIG. 1 is a block and schematic diagram of the automatic convergence and gray scale correction system according to the invention.

Referring now to FIG. 1 of the drawings, an eight bit microprocessor 10, such as a microprocessor of the TMS 70000 series, is the heart of the convergence and gray scale correction system. Assuming the availability of a TV type signal, the microprocessor 10 is reset to the beginning of program at each vertical sync pulse. A seven bit vertical counter 11 is also reset to 0 at the vertical sync pulse. At this point, the counter 11 begins to count horizontal lines using the horizontal sync pulses as the clock information. The counter 11 increments once for each horizontal line. In a similar manner, a seven bit horizontal counter 12 begins counting at each horizontal sync pulse. Counter 12 counts a 3.58 MHz clock signal from oscillator 13 which is synchronized to the 3.58 MHz chroma reference oscillator in the chroma section of the television receiver.

In the vicinity of the sensor 15, two of the three cathode ray tubes or electron guns are blanked or turned off using the $R_2$, $R_3$ and $R_4$ outputs from the microprocessor 10. As the light beam, in the case of a projection system, crosses the sensor 15, an output is produced. This output is processed by a threshhold amplifier 16 in order to obtain more accurate timing characteristics. The eight bit microprocessor 10 delivers at output $R_o$ a gating pulse $P_v$ to an array of AND gates 17 connected to the $Q_0$ to $Q_6$ outputs of counter 11. The information on the $Q_0$ to $Q_6$ outputs of the counter 11 is then latched into the microprocessor 10 at inputs $K_0$ to $K_6$. This information corresponds to the number of horizontal lines at which the beam crossed the sensor 15.

The microprocessor 10 then delivers at output $R_1$ a gating pulse $P_h$ to an array of AND gates 18 connected to the $Q_0$ to $Q_6$ outputs of the counter 12. This information is also latched into the microprocessor 10 at inputs $K_0$ to $K_6$ and represents the time into the horizontal line that the beam crossed the sensor 15. This time is determined by the number of 3.58 MHz pulses counted, one pulse corresponding to 0.28 microseconds.

The timing diagram for the sensor and count gating is shown in FIG. 3 of the drawings. Line a represents the sensor analog output when the beam crosses it. Line b shows the output of the threshhold amplifier 16. Lines c and d indicate how the microprocessor 10 divides the threshhold amplifier output into the vertical and horizontal gating pulses $P_v$ and $P_h$, respectively.

The position of the sensor 15 is known in terms of counts in both the vertical and horizontal directions, and this information is programmed into the microprocessor read only memory (ROM). The microprocessor 10 compares this data with the vertical and horizontal counts from counters 11 and 12, respectively, in order to develop error signals. These error signals are stored in the microprocessor random access memory (RAM). The process is then repeated for the remaining two cathode ray tubes or guns.

The error signals stored in the microprocessor RAM are then used to develop horizontal and vertical correction signals. This is accomplished by integrating with RC integrators 19 and 20 variable duty cycle pulse trains produced by the microprocessor 10 to develop a d.c. voltage to correct the position of the electron beam or light beam. These correction signals are applied to the receiver sweep system in a manner well-known in the art. The variable duty cycle pulse trains produced by the microprocessor 10 have frequencies which are proportional to the corresponding errors stored in the microprocessor RAM. This system is capable of determining the error on the first scan and supplying corrective action so that the next scan will be very close to the proper position. Once the correct position is achieved, the digital information for that particular correction can be maintained in the microprocessor RAM.

Figure 4:
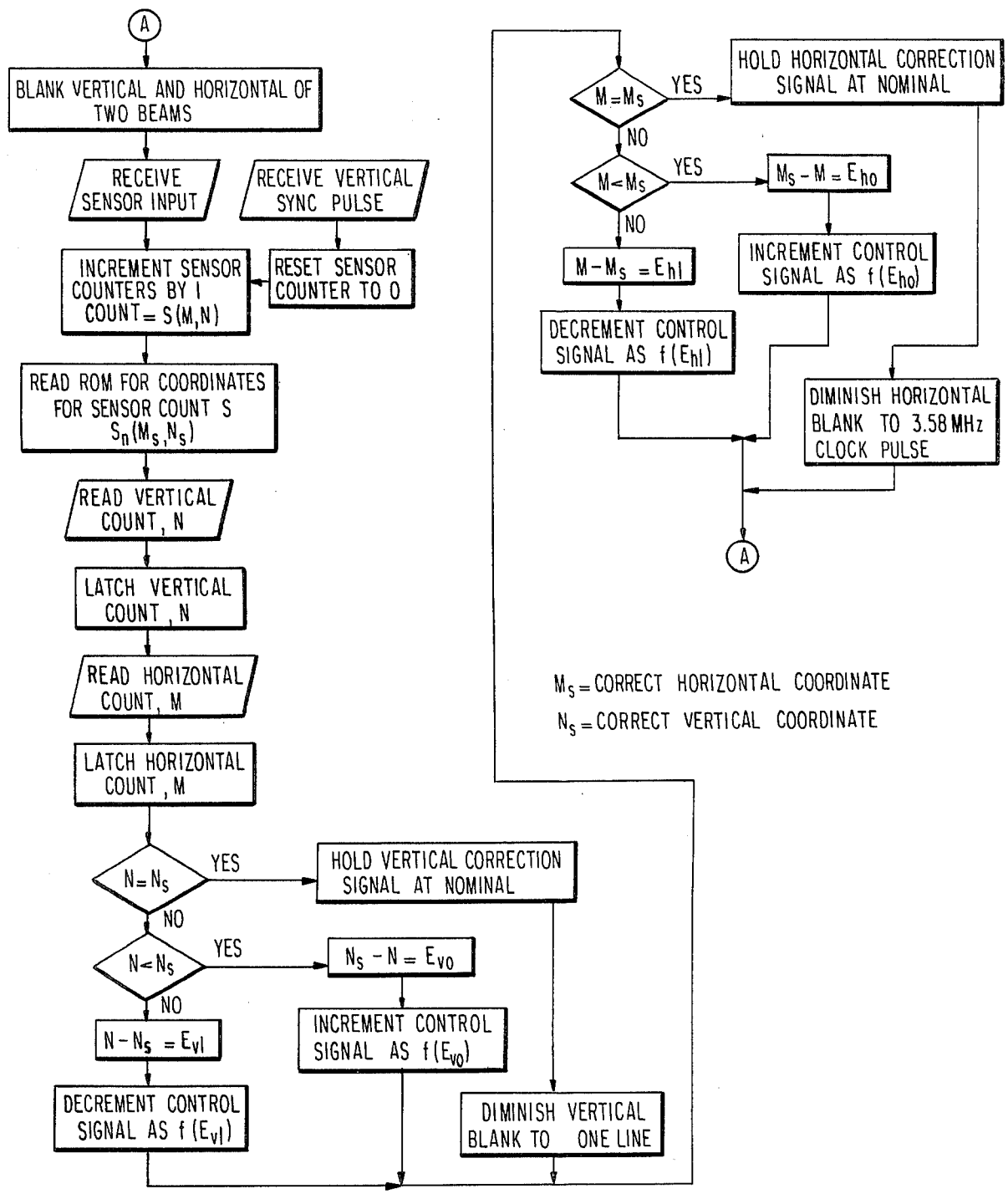
FIG. 4 is the convergence correction flow diagram for the microprocessor used in the system illustrated in FIG. 1.

The software flow chart describing the logic sequence for landing one beam on one sensor is shown in FIG. 4 of the drawings. With reference to that figure, the program begins by blanking the vertical and horizontal of two of the three light beams or cathode ray beams in the vicinity of the sensor and over an area sufficient to include anticipated convergence error. Then, when the light beam crosses the sensor, the sensor input is received and processed by the threshhold amplifier 16. Meantime, the vertical counter 11 is reset to 0 on receipt of the vertical sync pulse. The vertical counter 11 is incremented by one for each horizontal sync pulse, and the horizontal counter 12 is reset with each horizontal sync pulse and incremented by one for each pulse from the 3.58 MHz oscillator 13. The combined count is $S(M,N)$, where M is the horizontal count and N is the vertical count. While the counters 11 and 12 are being incremented, the coordinates for the sensor are read from the microprocessor ROM. The sensor coordinates correspond to a count $S_n (M_s,N_s)$, where $M_s$ is the correct horizontal coordinate and $N_s$ is the correct vertical coordinate. When the sensor analog input is received from the threshhold amplifier 16, the microprocessor 10 reads the vertical count N contained in the vertical counter 11. This count is latched into the microprocessor 10. Immediately thereafter, the microprocessor 10 reads the horizontal count M in the horizontal counter 12 and latches this count. The microprocessor 10 then makes a comparison of the actual and correct counts. First the vertical count N is compared with the correct count $N_s$. If $N=N_s$, then the vertical correction signal is at the correct level. If, however, the count N is less than $N_s$, then the difference $N_s$ minus N represents the value of the required correction voltage $E_{vo}$. The control signal is then incremented as a function of $E_{vo}$. If on the other hand, N is greater than $N_s$, the difference N minus $N_s$ represents the control signal $E_{v1}$.

In this case, the control signal is decremented as a function of $E_{v1}$. A comparison is then made between M and $M_s$. If M is equal to $M_s$, the horizontal correction signal does not have to be changed. If, however, M is less than $M_s$, then the difference $M_s$ minus M represents the correction signal $E_{ho}$. The control signal is then incremented as a function of $E_{ho}$. On the other hand, if M is greater than $M_s$, then the difference M minus $M_s$ represents the correction voltage $E_{h1}$. The control signal is then decremented as a function of $E_{h1}$. The program then recycles as indicated by the connectors A in FIG. 4. In the case where either or both of the vertical and horizontal counts equal the correct coordinate counts of the sensor, then on the next cycle of the program, the area around the sensor which is blanked can be made smaller. Thus, when the count N is equal to the correct count $N_s$, the vertical blanking can be diminished to + or − one line. In like manner, when the count M is equal to the correct count $M_s$, the horizontal blanking can be diminished to + or − one horizontal count (3.58 MHz clock pulse). This feature would be important where the sensor is in the field of view as indicated in FIG. 1 of the drawings. By making the blanking area in the vicinity of the sensor as small as possible, the operation of the correction system according to the invention becomes practically unobservable.

Correction may be done with a single sensor or with an array of sensors for better correction over the entire screen. For a simple static convergence system, only one sensor is required at the center of the CRT screen. Dynamic convergence could be accomplished by using an array of sensors over the CRT face as indicated in FIGS. 5 and 5A. The sensors would be arrayed in a matrix and connected with very small wires so as not to be visible to the viewer. A selector system would step through the matrix and perform the convergence function for each gun at each point. In doing this, dynamic convergence, as well as raster distortion correction could be accomplished. By using seven bit counters, a total of 128 ($2^7$) possible landing positions in both the horizontal and vertical directions can be detected during one count sequence. The counter will roll over at the end of the 128th count if a reset pulse has not been received. The 128 line by 128 3.58 pulse area is large enough to minimize sensor ambiguity.

In an alternative multi-array system, the sensors could be located around the perimeter of the screen in the over-scanned area of the CRT. In either the matrix array or perimeter array, the position for each sensor would be stored in the microprocessor ROM. In this way, the system knows which sensor is being activated by counting sensor pulses after initialization reset.

The physical arrangement of the sensors may take many forms. As just mentioned, the sensors could be arranged about the perimeter of a CRT in the over-scanned region. Obviously, in a projection television, an array of sensors could be located at least about part of the perimeter and on a part of the screen which is outside the viewing area. Moreover, one sensor could be used instead of many in combination with fiber optics as illustrated in FIG. 6.

Upon completion of the convergence correction, gray scale correction is performed, but in this case only a single sensor is required. Thus, for example, if the matrix array shown in FIG. 5 is used, then gray scale correction would be accomplished at the screen center, Cc. Returning now to FIG. 1 of the drawings, the output of sensor 15 is supplied to an amplifier 21 the output of which is connected to gating amplifiers 22, 23 and 24. These gating amplifiers are sequentially enabled by the blanking signals produced at the outputs $R_2$, $R_3$ and $R_4$ of the microprocessor 10. Turning now to FIG. 2, the separate red, green and blue control signals produced by the gating amplifiers 22, 23 and 24, respectively, are supplied to corresponding reference amplifiers 25, 26 and 27. The reference amplifier 25, is provided with a reference red voltage level which is compared with the red control signal from gating amplifier 22. The difference between the control and reference signals is an error signal which is stored in the hold circuit 28. This error signal represents the red correction and is used to set the gun drive in a manner well-known in the art. Similarly, the hold circuits 29 and 30 supply green and blue correction signals, respectively. In this way, the proper luminance is obtained for each of the three guns or light beams in order to maintain the gray scale.

Several sequences of correction are possible with the automatic convergence and gray scale correction system according to the invention. First, the system can automatically update continually looking for errors in convergence in gray scale as long as the television receiver is on. In the case where the sensors are in the field of view of the CRT face plate or the projection screen, this approach could produce objectionable white squares on the screen face, but as previously mentioned, this can be minimized by limiting the area that is blanked in the vicinity of the sensors. Alternatively, the system can update at periodic intervals such as, for example, every hour, every four hours, or the like. In this case, the microprocessor 10 would need to receive an interrupt signal from a clock to initiate the correction process. Many modern television receivers include a time of day clock which could provide the required interrupt signals, but if such a clock is not available, then it can be easily provided as a separate circuit. A third possibility is that the system can update after each turn on of the receiver. To allow the receiver circuitry to stabilize, the update would be delayed for perhaps five minutes into the warm-up period.

We claim:

1. A system operative during normal viewing for the automatic correction of convergence and gray scale in color television receivers employing three cathode ray beams comprising:
   at least one light sensor permanently positioned to detect a spot of light from a predetermined location on the display surface of said color television receiver;
   means for blanking a different two of the three cathode ray beams on successive scans of the display surface in the vicinity of said light sensor;
   processing means connected to receive the output of said light sensor for producing the timing characteristics indicative of the time required for the scan of the non-blanked cathode ray beam to reach said predetermined location of the light sensor;
   first comparing means connected to said processing means for comparing the timing characteristics of the light sensor output for each said successive scan with predetermined timing characteristics to develop position error signals for each of said cathode ray beams; and
   first correction means responsive to said position error signals for developing vertical and horizontal correction signals to correct the convergence of each of said three cathode ray beams.

2. A system for the automatic correction of convergence and gray scale in color television receivers as recited in claim 1 further comprising:
   first, second and third gated amplifier means connected to receive the output of said light sensor for developing output signal levels corresponding to light levels on successive scans;
   second comparing means for comparing the outputs of said first, second and third gated amplifier means with a preset level to generate respective brightness error signals; and
   second correction means responsive to said brightness error signals for developing electron gun drive correction signals to correct the gray scale of the color television receiver.

3. A system for the automatic correction of convergence and gray scale in color television receivers as recited in claims 1 or 2 wherein said processing means comprises:
   vertical counting means initiated by the vertical sync pulse of the television receiver for counting the horizontal sync pulses during the scan of said one of said cathode ray beams, the count in said vertical counting means at the time of the light sensor output representing the vertical timing characteristic of the light sensor output; and
   horizontal counting means initialized by the horizontal sync pulse from the television receiver for counting the time of the horizontal sweep of the cathode ray beam, the count in said horizontal counting means at the time of the sensor output representing the horizontal timing characteristic of the light sensor output.

4. A system for the automatic correction of convergence and gray scale in color television receivers as recited in claim 1 having an array of light sensors each permanently positioned to detect a spot of light from a predetermined different location on the display surface of said color television receiver.

5. A system for the automatic correction of convergence and gray scale in a color television receiver as recited in claim 4 wherein said array is in the form of a matrix on the display surface of said color television receiver.

6. A system for the automatic correction of convergence and gray scale in a color television receiver as recited in claim 4 wherein said array is positioned about the perimeter of said display surface of the color television receiver.

7. A system operative during normal viewing for the automatic correction of convergence and gray scale in a color television receiver employing three cathode ray beams, comprising:
   at least one light sensor permanently positioned to detect a spot of light from a predetermined location on the display surface of said color television receiver;
   means for blanking a different two of the three cathode ray beams on successive scans of the display surface in the vicinity of said light sensor;
   vertical counting means initiated by the vertical sync pulse of said television receiver for counting horizontal sync pulses during the scan of a cathode ray beam;
   oscillator means synchronized with the chroma reference of said television receiver for producing clock pulses;

horizontal counting means initiated by the horizontal sync pulse from said television receiver for counting said clock pulses;

microprocessor means responsive to the output of said light sensor for latching the counts of said vertical and horizontal counter means, said microprocessor means comparing the latched counts of said vertical and horizontal counting means with predetermined timing characteristics to develop position error signals for each of said three cathode ray beams; and convergence correction means responsive to the position error signals developed by said microprocessor means for producing vertical and horizontal correction signals to correct the convergence of each of said three cathode ray beams.

8. A system for the automatic correction of convergence and gray scale in color television receivers as recited in claim 7 wherein said correction means comprises integrator means for integrating variable pulse rates from said microprocessor to produce d.c. convergence correction signals.

9. A system for the automatic correction of convergence and gray scale in color television receivers as recited in claim 7 further comprising:

first, second and third gated amplifier means connected to receive the output of said light sensor for developing output signal levels corresponding to light levels on successive scans;

comparing means for comparing the outputs of said first, second and third gated amplifier means with a preset level to generate respective brightness error signals; and gray scale correction means responsive to said brightness error signals for developing electron gun drive correction signals to correct the gray scale of the color television receiver.

10. A system for the automatic correction of convergence and gray scale in color television receivers as recited in claim 7 comprising an array of light sensors, each sensor being permanently positioned to detect a spot of light from a predetermined location on the display surface of said color television receiver.

11. A system for the automatic correction of convergence and gray scale in color television receivers as recited in claim 10 wherein said array is a matrix on the display surface of said color television receiver.

12. A system for the automatic correction of convergence and gray scale in color television receivers as recited in claim 10 wherein said array of light sensors is positioned about the perimeter of the display surface of said color television receiver.

* * * * *